(12) United States Patent
Trivedi et al.

(10) Patent No.: US 10,946,555 B2
(45) Date of Patent: Mar. 16, 2021

(54) CONFORMAL COOLING MOLDS WITH LATTICE STRUCTURES FOR INJECTION MOLDING

(71) Applicant: Autodesk, Inc., San Rafael, CA (US)

(72) Inventors: Abhishek Trivedi, Pleasant Hill, CA (US); Andriy Banadyga, Uxbridge (GB)

(73) Assignee: Autodesk, Inc., San Rafael, CA (US)

( * ) Notice: Subject to any disclaimer, the term of this patent is extended or adjusted under 35 U.S.C. 154(b) by 700 days.

(21) Appl. No.: 15/786,254

(22) Filed: Oct. 17, 2017

(65) Prior Publication Data
US 2019/0111590 A1    Apr. 18, 2019

(51) Int. Cl.
| | | |
|---|---|---|
| *B29C 33/38* | (2006.01) | |
| *B29C 33/42* | (2006.01) | |
| *B33Y 80/00* | (2015.01) | |
| *B29C 64/386* | (2017.01) | |
| *B29C 64/40* | (2017.01) | |

(Continued)

(52) U.S. Cl.
CPC ...... *B29C 33/3835* (2013.01); *B29C 33/3814* (2013.01); *B29C 33/42* (2013.01); *B29C 45/26* (2013.01); *B29C 64/386* (2017.08); *B29C 64/40* (2017.08); *B33Y 50/00* (2014.12);
(Continued)

(58) Field of Classification Search
CPC . B29C 33/3835; B29C 33/3842; B29C 33/42; B29C 45/26; B29C 64/386; B29C 64/40; B29C 33/02; B29C 33/3814; B29C 33/3828; B33Y 50/00; B33Y 80/00
See application file for complete search history.

(56) References Cited

U.S. PATENT DOCUMENTS 6,397,922 B1 *  6/2002  Sachs ..................... B22C 9/00
                                                        164/4.1
6,623,687 B1 *  9/2003  Gervasi ................. F28F 21/06
                                                        264/401

(Continued)

OTHER PUBLICATIONS

Zink, Béla, et al. "Enhanced injection molding simulation of advanced injection molds." Polymers 9.2 (2017): 77.*

(Continued)

*Primary Examiner* — Rehana Perveen
*Assistant Examiner* — Steven W Crabb
(74) *Attorney, Agent, or Firm* — Fish & Richardson P.C.

(57) ABSTRACT

Methods, systems, and apparatus, including medium-encoded computer program products, for designing and manufacturing conformal cooling molds with lattice structures include, in one aspect, a method including: obtaining temperature and pressure data for a 3D model of a conformal cooling mold from computer simulation of injection molding; replacing a volume of the 3D model with a lattice structure to reduce the mass of the mold; adjusting a number of lattice unit cells for the lattice structure in accordance with the temperature data to increase heat conduction from hotter areas of the mold; adjusting thickness(es) of beams forming the lattice structure in accordance with the pressure data to prevent structural failure of the mold; and providing an updated version of the 3D model of the conformal cooling mold that incorporates the lattice structure after adjustment of the number of lattice unit cells and the thickness(es) of beams forming the lattice structure.

12 Claims, 5 Drawing Sheets

(51) Int. Cl.
  *B33Y 50/00* (2015.01)
  *B29C 45/26* (2006.01)
  *B29C 33/02* (2006.01)

(52) U.S. Cl.
  CPC .............. *B33Y 80/00* (2014.12); *B29C 33/02* (2013.01); *B29C 33/3828* (2013.01); *B29C 33/3842* (2013.01)

(56) References Cited

U.S. PATENT DOCUMENTS

| | | | |
|---|---|---|---|
| 2007/0063378 A1* | 3/2007 | O'Donoghue | B29C 33/40 264/219 |
| 2012/0148699 A1 | 6/2012 | Cho et al. | |
| 2014/0087017 A1 | 3/2014 | Oh et al. | |
| 2017/0144351 A1 | 5/2017 | Tan et al. | |
| 2017/0173866 A1 | 6/2017 | Schonenberg et al. | |

OTHER PUBLICATIONS

Wu, Tong, Kai Liu, and Andres Tovar. "Multiphase topology optimization of lattice injection molds." Computers & Structures 192 (2017): 71-82.*

"Design Enhancements for Conformal-Cooled Insert Leverage 3D Printing Capabilities", Additive Manufacturing Magazine. Fuges, Christina M. Mar. 22, 2017.*

Kantareddy, S. N. R., et al. "Saving weight with metallic lattice structures: Design challenges with a real-world example." Solid Freeform Fabrication Symposium (SFF), Austin, TX, Aug. 2016.*

Brooks, Hadley, and Kevin Brigden. "Design of conformal cooling layers with self-supporting lattices for additively manufactured tooling." Additive Manufacturing 11 (2016): 16-22.*

Unknown Author, "Conformal Cooling: Why Use it Now?—Plastics Today," (Aug. 1, 2017) [online] (retrieved from https://www.plasticstoday.com/injection-molding/conformal-cooling-why-use-it-now/44493914113440), 18 pages.

Autodesk University presentation at http://au.autodesk.com/au-online/classes-on-demand/class-catalog/2016/within/mp21441#chapter=0, (Nov. 1, 2016) [online] (computer-generated transcript), 20 pages.

Unknown author, "Conformal Cooling Analysis—Moldflow Insight—Autodesk Knowledge Network," (Oct. 11, 2017) [online] (retrieved from https://knowledge.autodesk.com/support/moldflow-insight/learn-explore/caas/CloudHelp/cloudhelp/2017/ENU/MoldflowInsight/files/GUID-09B6241A-63B4-4B64-8755-10DE44FD1CB8-htm.html), 5 pages.

Unknown author, "About the Optimization Utility—Netfabb—Autodesk Knowledge Network," (Oct. 11, 2017) [online] (retrieved from https://knowledge.autodesk.com/support/netfabb/learn-explore/caas/CloudHelp/cloudhelp/2017/ENU/NETF-Utility-Optimization/files/GUID-F9E8CC95-6E45-44DD-8836-049557E71F2A-htm.html), 4 pages.

* cited by examiner

CONFORMAL COOLING MOLDS WITH LATTICE STRUCTURES FOR INJECTION MOLDING

BACKGROUND

This specification relates to computer aided design and manufacture of molds for injection molding applications, and in particular to using three dimensional (3D) modeling and simulation programs, and additive manufacturing, to design and manufacture conformal cooling molds with lattice structures.

In various industries, injection molds are used to manufacture parts, where a cavity of the mold receives a liquid (e.g., plastic resin, metal, etc.) that is solidified in the mold to form the part. The cavity of the mold has a shape corresponding to the part to be manufactured, and other components often include a mold core that fits into the cavity and a clamp that attaches to the mold to produce an appropriate amount of pressure on the liquid in the mold cavity as the liquid is solidified. In addition, some molds have associated cooling lines (pipes or channels) that guide a cooling fluid in proximity to the mold cavity to assist in solidifying the liquid.

Molds have been designed for manufacture by additive manufacturing techniques (i.e., using various 3D printing technologies). In addition, some molds integrate the cooling lines into the mold itself, thereby creating a conformal cooling mold. For example, a mold defining both a cavity of the mold and cooling lines for the mold can be manufactured as a single part using additive manufacturing techniques, which can facilitate putting the cooling lines closer to the liquid to be cooled.

SUMMARY

This specification describes technologies relating to computer aided design and manufacture of molds for injection molding applications, and in particular to using three dimensional (3D) modeling and simulation programs, and additive manufacturing, to design and manufacture conformal cooling molds with lattice structures.

In general, one or more aspects of the subject matter described in this specification can be embodied in one or more methods that include: obtaining temperature data and pressure data for a three dimensional model of a conformal cooling mold from a computer simulation of an injection molding process using the conformal cooling mold; replacing at least a portion of a solid volume of the three dimensional model of the conformal cooling mold with a lattice structure to reduce a total mass of the conformal cooling mold; adjusting a number of lattice unit cells for the lattice structure in accordance with the temperature data from the computer simulation to increase heat conduction through the lattice from hotter areas of the conformal cooling mold; adjusting one or more thicknesses of beams forming the lattice structure in accordance with the pressure data from the computer simulation to prevent structural failure of the conformal cooling mold; and providing an updated version of the three dimensional model of the conformal cooling mold that incorporates the lattice structure after adjustment of the number of lattice unit cells and the one or more thicknesses of beams forming the lattice structure.

According to another aspect, a conformal cooling mold for injection molding includes: a mold cavity including integrated cooling lines; a mold core configured to fit into the mold cavity; and a lattice coupled with the mold cavity and with the cooling lines integrated into the mold cavity; wherein the lattice includes a lattice unit that has been reproduced multiple times to form the lattice in the conformal cooling mold, the lattice unit including beams within a lattice unit cell; wherein a density of the lattice varies in proximity to the mold cavity and the cooling lines integrated into the mold cavity so as to improve heat conduction properties of the conformal cooling mold; and wherein a density of each of two or more lattice unit cells of the lattice varies to provide additional structural support to the mold cavity where needed.

According to another aspect, a system includes: a data processing apparatus including at least one hardware processor; and a non-transitory computer-readable medium encoding instructions configured to cause the data processing apparatus to perform operations including replace at least a portion of a solid volume of a three dimensional model of a conformal cooling mold with a lattice structure to reduce a total mass of the conformal cooling mold, adjust a number of lattice unit cells for the lattice structure, in accordance with temperature data from a computer simulation of an injection molding process using the conformal cooling mold, to increase heat conduction through the lattice from hotter areas of the conformal cooling mold, adjust one or more thicknesses of beams forming the lattice structure in accordance with pressure data from the computer simulation to prevent structural failure of the conformal cooling mold, and save an updated version of the three dimensional model of the conformal cooling mold that incorporates the lattice structure after adjustment of the number of lattice unit cells and the one or more thicknesses of beams forming the lattice structure.

Particular embodiments of the subject matter described in this specification can be implemented to realize one or more of the following advantages. Conformal cooling molds with better heat dissipation properties can be designed and manufactured. By increasing the speed at which injection molded material can be cooled inside a conformal cooling mold, cycle times for injection molding applications can be reduced, which can result in significant cost savings. In addition, the amount of material used to create the conformal cooling mold can be reduced, resulting in lower costs for the mold itself. Note that less material can be used to create the conformal cooling mold without sacrificing the strength of the mold or the cooling time needed during injection molding. In some cases, the amount of material used to create the conformal cooling mold can be reduced while simultaneously increasing the strength of the mold and increasing the cooling rate for the mold. Thus, a conformal cooling mold can be redesigned to make the mold both lighter and stronger than the previous mold, and also make the mold better at conducting heat away from the mold cavity where temperature is high relative to rest of the mold and avoid recirculation of heat in the areas where temperature has already cooled off relative to hot areas.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
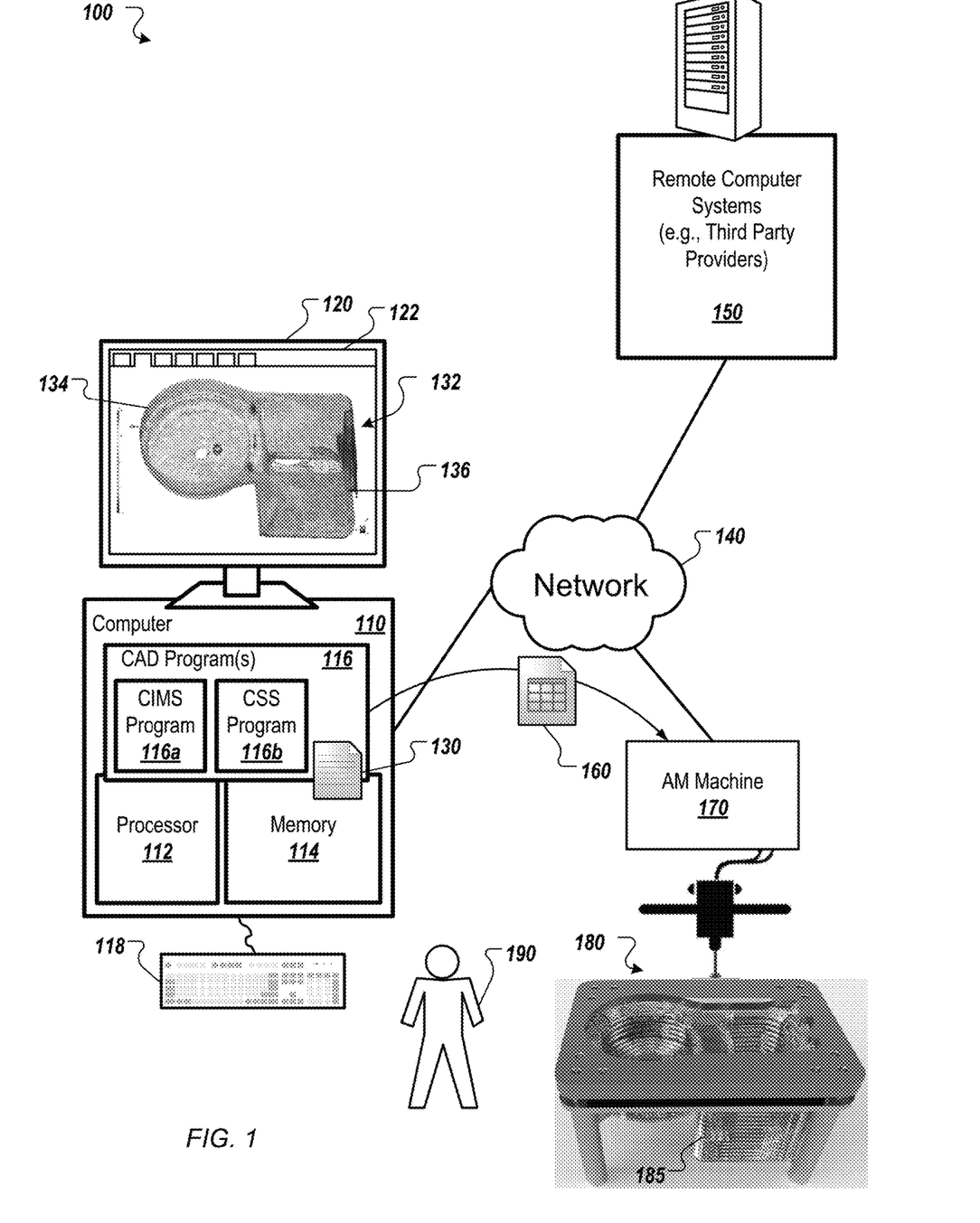
FIG. 1 shows an example of a system usable to design and manufacture lattice structures in conformal cooling molds.

FIG. 1 shows an example of a system 100 usable to design and manufacture lattice structures in conformal cooling molds. In the example shown, an additive manufacturing machine is used, but the invention is not limited to use with a particular type of manufacturing system. For example, the systems and techniques described herein can be used with various types of additive manufacturing (AM), three dimensional (3D) printing, subtractive manufacturing (SM), investment casting, etc.

A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more 3D modeling and simulation programs such as a computer aided design (CAD) program 116, which can run locally on computer 110, remotely on a computer of one or more remote computer systems 150 (e.g., one or more third party providers' one or more server systems accessible by the computer 110 via the network 140) or both locally and remotely. The CAD program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the one or more 3D modeling and simulation programs to create and/or load a 3D model of a mold for an injection molding application. This can be done using known graphical user interface tools. The 3D model can be defined in the computer using various known 3D modeling formats, such as using solid models (e.g., voxels) or surface models (e.g., B-Rep (Boundary Representation), surface meshes). In addition, the user 190 can interact with the one or more 3D modeling and simulation programs to add cooling lines for the 3D model of the mold to create a conformal cooling mold.

For example, in some implementations, the one or more 3D modeling and simulation programs include a computational injection molding simulation (CIMS) program 116a, e.g., MOLDFLOW® software, available from Autodesk, Inc., of San Rafael, Calif., or SIGMASOFT® software, available from SIGMA Plastic Services, Inc., of Schaumburg, Ill., or Moldex3D° software, available from Coretech Systems Co., Ltd., of Taiwan. The CIMS program 116a can be a standalone software application, or be integrated with another software application, such as CAD program 116. The user 190 or a program component of the system 100 can operate the CIMS program 116a to simulate an injection molding process (e.g., plastic injection molding) using the 3D model of the mold and generate data that represents how the injected material (e.g., plastic) is likely to flow inside the mold, as well as the resulting temperatures and pressures that will likely be produced inside the mold.

For example, as shown in FIG. 1, a representation 132 of a 3D model of a mold for a part of a blender (which is but one example of many possible parts) is displayed in the UI 122 and shows how the injected material will flow through the mold, as well as hotter areas 134 and cooler areas 136 of the mold resulting therefrom, as predicted based on an injecting molding process to be used with the mold. Using the data generated by the simulation, cooling lines can be added to the 3D model of the mold, moved within the 3D model of the mold, or both. In addition, the simulation can be repeated with the cooling lines included in the 3D model to generate updated temperature and pressure data, and the 3D model can be redesigned as needed to improve cooling performance (e.g., by adjusting the number and locations of the cooling lines within the 3D model) and generate a complete 3D model of a conformal cooling mold.

With a 3D model design of the conformal cooling mold in hand, further processing of the 3D model can be performed to improve the conformal cooling mold. This can include removing one or more volumes from 3D model of the mold to reduce the amount of material needed to manufacture the mold, but without degrading the structural integrity of the conformal cooling mold (or at least without a degradation that is too much for the intended injection molding process). In addition, one or more volumes from 3D model of the mold can be replaced with one or more lattice structures, as described in further detail below, to reduce the amount of material needed to manufacture the mold, increase the structural integrity of the mold, improve thermal cooling properties of the mold, or to achieve a combination of two or more of the foregoing improvements in the conformal cooling mold. Note that the 3D model of the conformal cooling mold can include both a 3D model of the mold cavity and a 3D model of the mold core, which can each include cooling lines, and the removing and/or replacing operations can be performed with both the cavity portion of the mold and the core portion of the mold.

In some implementations, the 3D model of the conformal cooling mold is created as described above before proceeding to the next step. In some implementations, the 3D model of the conformal cooling mold and the temperature and pressure data are provided as an input data to the computer 110. In any case, the one or more 3D modeling and simulation programs (e.g., CAD programs 116) can be used to improve the design of the 3D model of the conformal cooling mold by adding a lattice structure to the mold design in view of thermal analysis data generated for the mold design. One or more volumes of the 3D model are replaced with a lattice using the one or more 3D modeling and simulation programs, and the density of the lattice is adjusted in different portions of the replaced volume(s) based on the thermal analysis (e.g., the temperature data output from the CIMS program 116a) to improve the thermal conduction properties of the conformal cooling mold.

In hotter areas of the mold, the density of the lattice is increased. This means that the size of the unit cells in which beams (or equivalently, struts) are arranged to form the lattice are reduced in the hotter areas since smaller cell sizes generally translates into more beam material (e.g., metal beams) forming the lattice and thus more material through which heat is conducted away from the inside of the mold. In addition, in cooler areas of the mold, the density of the lattice can be decreased by increasing the size of the unit cells in which beams are arranged to form the lattice. In some implementations, the one or more 3D modeling and simulation programs can also be used to decrease the density of the lattice in portions of the lattice that can undesirably recirculate heat within the mold, thus increasing the cooling time needed for the mold. In some cases, when the pressure data allows for even less structure in the mold design, one or more volumes of the mold material can be entirely removed so as to reduce or eliminate undesirable recirculation of heat within the mold.

Once the thermal adjustment of the lattice density is completed, e.g., customizing lattice density through a volume of the 3D model of the conformal cooling mold using thermal gradient data from the CIMS program 116a, the one or more 3D modeling and simulation programs can be used to simulate application of the internal pressure and clamp load followed by structural analysis and adjustment. The structural adjustment can include adjusting the density of lattice unit cells in view of the stress analysis obtained from the simulation. For a given unit cell of a lattice, increasing the thickness of the beams of the lattice within that cell results in an increase in density of material within that cell as well as increased structural strength for the lattice in that cell. Likewise, for a given unit cell of a lattice, decreasing the thickness of the beams of the lattice within that cell results in a decrease in density of material within that cell as well as decreased structural strength for the lattice in that cell. In some implementations, the beams are only thickened where needed to prevent structural failure. In some implementations, the beams are both thickened and thinned as appropriate to optimize the structural design in view of expected loading and pressure conditions during injection molding applications using the conformal cooling mold.

In some implementations, the one or more 3D modeling and simulation programs include a computational structural simulation (CSS) program 116b, e.g., NETFABB® software, available from Autodesk, Inc., of San Rafael, Calif., or OPTISTRUCT software, available from Altair Engineering, Inc., of Troy, Mich., or BETATYPE software, available from Betatype Ltd. at www.betaty.pe. The CSS program 116b can be a standalone software application, or be integrated with another software application, such as CAD program 116. The user 190 or a program component of the system 100 can operate the CSS program 116b to simulate (using the 3D model data) the structural performance of the conformal cooling mold and to modify the lattice structure design so as to avoid stress and buckling failures. In particular, the user 190 or a program component of the system 100 can operate the CSS program 116b to adjust beam thicknesses within the lattice portion of the 3D model based on the expected pressure conditions.

Note that there is pressure from the mold cavity, and then there is a clamp attached to it, which produces the clamp pressure. So the structural optimization software should be run to increase the thickness of individual beams as well to ensure the mold doesn't break or leak. In some implementations, this is an automated process performed entirely by the CSS program 116b. In some implementations, the adjustment of lattice density to improve thermal conductivity is also performed using the CSS program 116b. Moreover, the system 100 can be used to perform the lattice density adjustment (for thermal conduction) and the lattice unit cell density adjustment (for structural optimization) more than once for the same 3D model, including an iterative process that alternates between thermal adjustment and structural adjustment of the 3D model of the conformal cooling mold, and including performing such operations for both the cavity and the core of the mold design (note that FIG. 1 only shows the cavity portion of the mold, but application of the same systems and techniques to the core portion of the mold will be readily understood from the present description).

Once the 3D model of the conformal cooling mold is completed, the 3D model can be prepared for additive manufacturing of a conformal cooling mold 180. The 3D model and its lattice structure can be stored as a document 130 and/or used to generate another representation of the model (e.g., an .STL file for additive manufacturing) with the lattice structure included therein. This can be done upon request by the user 190, or in light of the user's request for another action, such as sending the 3D model to an AM machine 170, or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the one or more 3D modeling and simulation programs (e.g., CAD program 116) can create a digital representation of the 3D model of the conformal cooling mold, including the lattice structure, and provide a document 160 (of an appropriate format) to the manufacturing machine 170 to create the conformal cooling mold 180, including lattice structure 185 to facilitate cooling of the mold with high relative structural integrity for the mold (as noted above, only the mold cavity is shown, but the mold core can also include the lattice structure). The manufacturing machine 170 can employ one or more additive manufacturing techniques, such as granular techniques (e.g., Selective Laser Sintering (SLS) and Direct Metal Laser Sintering (DMLS)), extrusion techniques (e.g., Fused Deposition Modelling (FDM)), or subtractive or any other computer aided manufacturing methods. In addition, the user 190 can save or transmit the 3D model of the new conformal cooling mold for later use. For example, the 3D modeling program 116 can store the document 130 that includes the 3D model and its lattice structure.

Figure 2:
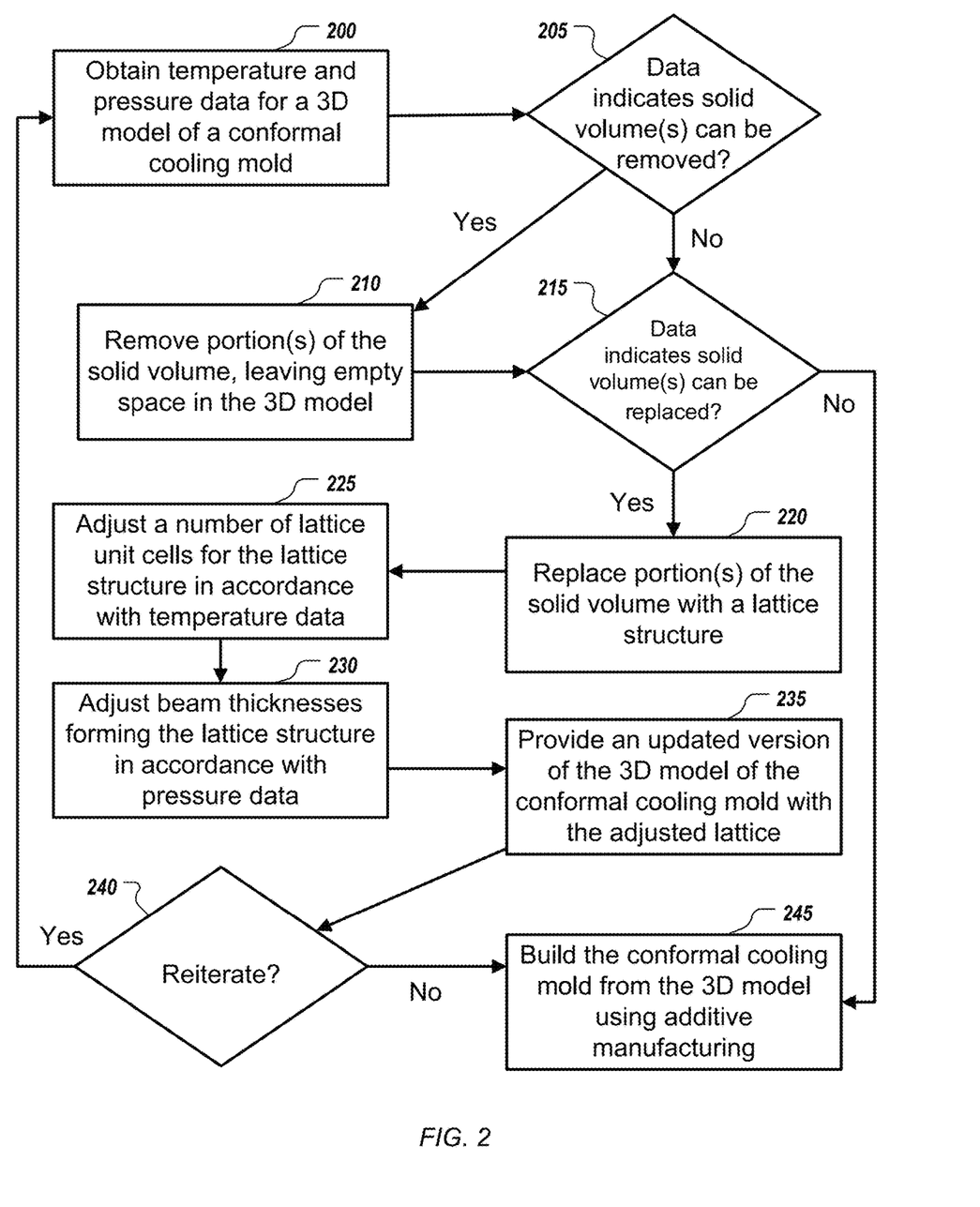
FIG. 2 shows an example of a process to design and manufacture conformal cooling molds including lattice structures for the cooling lines.

FIG. 2 shows an example of a process to design and manufacture conformal cooling molds including lattice structures for the cooling lines. Temperature data and pressure data for a 3D model of a conformal cooling mold is obtained 200 from a computer simulation of an injection molding process using the conformal cooling mold. In some implementations, this involves operating a computational injection molding simulation program to identify hotter areas and colder areas of the conformal cooling mold, along with pressure data, such as described above. In some implementations, this involves loading or receiving the temperature and pressure data for the 3D model.

The pressure data can be checked 205 to determine whether the data indicates that one or more solid volumes within the 3D model of the mold can be removed. The pressure data can be checked with respect to the entire volume of the solid portions of the 3D model of the mold and compared with one or more threshold values. For example, stress data is calculated for the solid portions of the 3D model (both mold core and mold cavity) from the pressure data (e.g., based on both clamp pressure and packing pressure due to molten plastic), and this stress data is compared with yield strength of the material used to fabricate the mold. In regions of the mold design where the stress data falls below a stress threshold value, solid portions of the 3D model can be removed without unduly impacting the structural integrity of the conformal cooling mold to be built from the 3D model. In some implementations, a factor of safety against stress failure of the mold is calculated by dividing calculated stress with yield stress, and material with a factor of safety above a first threshold (e.g., a factor of three) is marked for removal. If material marked for removal has negligible value for dissipation of heat as well, this material is removed. If the factor of safety falls below a second threshold (e.g., a factor of one), the mold is failing, and the optimization process reverts to the last successful mold design.

Thus, when such portion(s) are indicated, one or more portions of the solid volume of the 3D model are removed 210, leaving behind empty space in the 3D model. Note that in some implementations, the portions to be removed are selected in accordance with both the pressure data and the temperature data from the computer simulation. For example, some regions of the 3D model may have low enough pressures (and corresponding stresses) to justify complete removal of the mold material, but the temperature data can indicate that such a region will have too much heat to be dissipated for complete removal of all mold material in that region. Thus, in some implementations, both the temperature data and the pressure data are checked at 205 against respective threshold values to determine what portions of the 3D model of the mold can be removed entirely.

Further, regardless of whether or not a portion of the solid volume of the mold is removed in the 3D model, the temperature data is checked 215 to determine whether the data indicates that one or more solid volumes within the 3D model of the mold can be replaced with lattice structure. For example, the temperature data can be checked across the entire volume of the solid portions of the 3D model of the mold and compared with a temperature threshold value. In regions of the mold design where the temperature falls below the temperature threshold value, solid portions of the 3D model can be replaced without unduly reducing the thermal conductivity around the interior surfaces of the conformal cooling mold (cavity and/or core) and the cooling lines in proximity thereto. Further, in some implementations, after removing unnecessary material, the remaining volume of the 3D model of the mold design is converted into lattice and skin.

Thus, when such portion(s) are indicated, one or more portions of the solid volume of the 3D model are replaced 220 with lattice structure. Note that in some implementations, the portions to be replaced are selected in accordance with both the temperature data and the pressure data from the computer simulation. For example, the regions of the 3D model to be replaced 220 can be identified 215 in accordance with a combination of temperature and pressure data, where the temperature threshold for replacement is lowered with decreasing local pressure. Thus, in some implementations, both the pressure data and the temperature data are checked at 215, as addressed above.

If no replacements with lattice can be made, in some implementations, the process proceeds to build 245 the conformal cooling mold from the 3D model using additive manufacturing, e.g., by converting the 3D model of the conformal cooling mold into a file of an appropriate format for a particular additive manufacturing machine, and sending this file to the additive manufacturing machine, such as described above in connection with FIG. 1. If replacements with lattice are made at 220, the process then proceeds to adjust 225 a number of lattice unit cells for the lattice structure in accordance with the temperature data from the computer simulation. This adjustment can include both increasing the density of the lattice in some regions of the 3D model and decreasing the density of the lattice in other regions of the 3D model. In some implementations, the initial replacement 220 uses a low density lattice (large lattice unit cells) as a starting point, and then the adjusting 225 involves increasing the lattice density, as needed. In some implementations, the initial replacement 220 uses a high density lattice (small lattice unit cells) as a starting point, and then the adjusting 225 involves decreasing the lattice density, as needed.

In any case, the goal of the adjusting 225 is to increase heat conduction through the lattice from hotter areas of the conformal cooling mold. In addition, in some implementations, another goal of the adjusting 225 is to prevent undesirable recirculation of heat within the mold. For example, the adjusting 225 can include both increasing the number of lattice unit cells for the lattice structure in one or more first regions of the 3D model in proximity to the hotter areas of the conformal cooling mold identified by the temperature data from the computer simulation, and also reducing the number of lattice unit cells for the lattice structure in one or more second regions of the three dimensional model to prevent recirculation of heat by the cooling lines integrated into the conformal cooling mold.

In addition to making lattice density adjustments, the process also adjusts 230 one or more thicknesses of beams forming the lattice structure in accordance with the pressure data from the computer simulation to prevent structural failure of the conformal cooling mold. In some implementations, this involves operating a computational structural simulation program to avoid stress and buckling failure, such as described above. Note that the adjustments 230 can be made on a per-unit-cell basis, on a regional basis within the 3D model, or based on a combination of these. In addition, the thickness of the skin overlying the lattice structure is adjusted, as needed based on the pressure data, to avoid structural failure.

In any case, an updated version of the 3D model of the conformal cooling mold, which incorporates the lattice structure after adjustment of the number of lattice unit cells and the one or more thicknesses of beams forming the lattice structure, is provided 235. This can involve storing the updated 3D model (e.g., saving the 3D model to permanent storage) and/or outputting the updated 3D model to another program (e.g., sending the 3D model to a slicer program for processing to cause building 245 of the conformal cooling mold) or providing the updated 3D model to another component of the program effecting the process of FIG. 2.

In some implementations, a check can be made 240 as to whether the process should be repeated before finalizing the mold design for building 245 the conformal cooling mold. For example, the thermal conductivity of the 3D model can be compared to a target to see if further processing is needed, or the thermal conductivity of the 3D model can be compared to that achieved in a previous iteration to see if a point of diminishing returns on improved thermal conductivity has been reached. When a reiteration of the process is desirable, the updated 3D model can be processed (e.g., by the CIMS program 116a) to generate new simulation data for repeating the process of replacing and adjusting lattice components. In some situations, the changes in temperature and stress resulting from a first lattice replacement can create opportunities for further lattice replacement. Moreover, as noted above, the lattice replacement process can be applied to both the cavity and core portions of the mold design.

FIGS. 3A-3D show a two dimensional (2D) representation of a conformal cooling mold that is redesigned to include lattice structures for the cooling lines. It should be noted that the 2D representation is simplified to facilitate the clarity of this disclosure. For example, the lattice structures shown in FIGS. 3A-3D are simple, 2D representations of an "X" shape within a grid, but those skilled in the art will understand that various types of 3D lattice topologies can be used. In some implementations, a self-supporting structure is used, such as an "X" lattice topology, where each lattice unit includes four beams that each form an angle of forty five degrees with a horizontal plane.

Note that "self-supporting" refers to the lattice material not needing extra support material during additive manufacturing of the lattice structure, and while self-supporting lattice structures are beneficial, especially for mold designs with a reasonably complex core and cavity, they are not required. In some cases, a grid lattice topology may be more meaningful due to geometric shape and lower complexity with 3d printing, and for some additive manufacturing systems (e.g., using granular techniques) there is no concern with support for the object being manufactured, or the support material can be readily removed after manufacture. Thus, lattice topology and orientation can be taken into consideration in view of the manufacturing technique(s) that are to be used for the mold. Moreover, many different types of beams can be used (both in terms of cross-section shapes and in terms of allowed variation in dimensions) in the same lattice. For further details regarding various types of lattice geometries, see: US Pub. No. 2016-0209820, published on Jul. 21, 2016; US Pub. No. 2016-0232262, published on Aug. 11, 2016; and PCT App. No. EP2017-059918, filed on Apr. 26, 2017, and published on a date to be determined; each of these applications is hereby incorporated by reference.

Figure 3A:
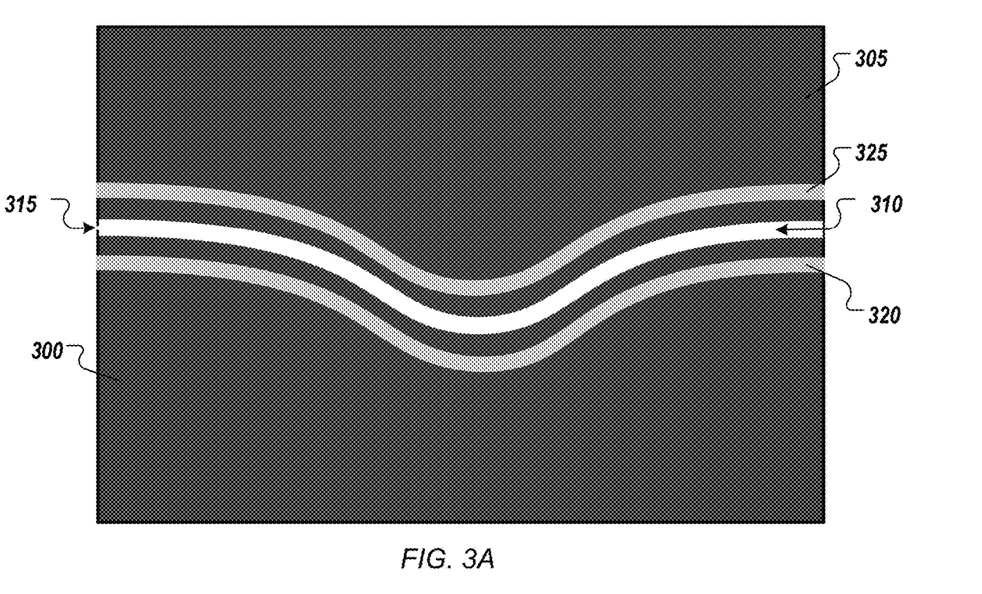
FIGS. 3A-3D show a two dimensional (2D) representation of a conformal cooling mold that is redesigned to include lattice structures for the cooling lines.

As shown in FIG. 3A, a design for a conformal cooling mold includes a cavity 300 and a core 305 that mates with the cavity 300 to create a space 310 for hot liquid that is injected at a gate location 315. In addition, the design includes cooling lines 320, 325 that are integrated within the respective cavity 300 and core 305 portions of the mold. Using the systems and techniques described above, one or more solid regions of the mold cavity 300 and/or one or more solid regions of the mold core 305 are replaced with a lattice.

Figure 3B:
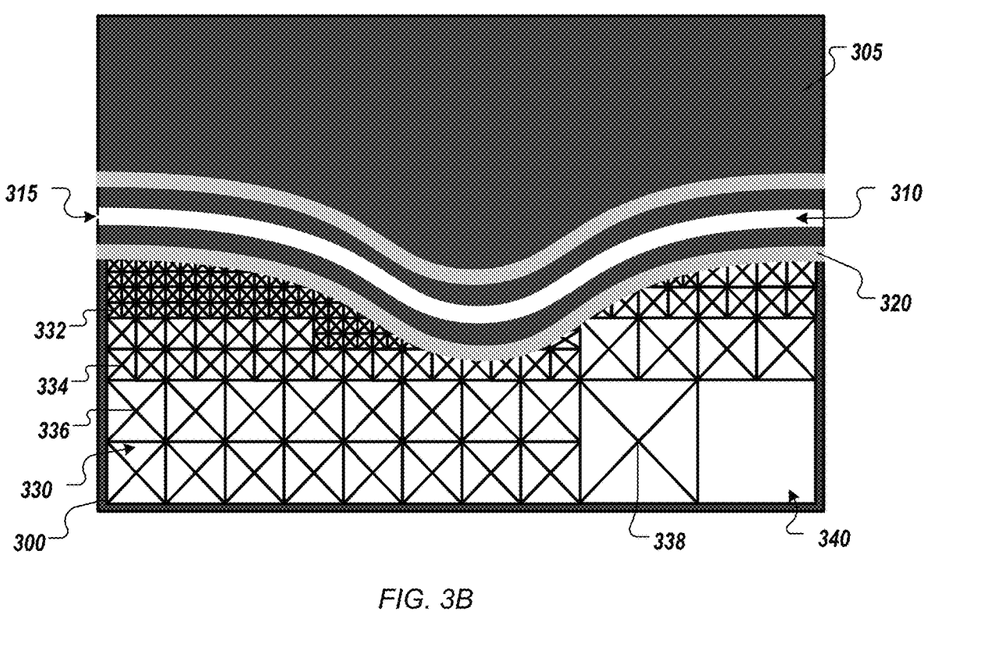

For example, as shown in FIG. 3B, a substantial portion of the mold cavity 300 is replaced with a lattice 330 that couples with the mold cavity 300 and with the cooling line 320 integrated into the mold cavity 300. The lattice 330 is composed of a lattice unit that has been reproduced multiple times to form the lattice 330, where each lattice unit includes beams within a lattice unit cell. In addition, the density of the lattice 330 varies in proximity to the mold cavity and the cooling lines integrated into the mold cavity so as to improve heat conduction properties of the conformal cooling mold.

In the example shown in FIG. 3B, the lattice 330 is composed of four distinct lattice unit sizes: a smallest lattice unit 332 (forming the highest density portion of the lattice 330), a next smallest lattice unit 334 (forming the next highest density portion of the lattice 330), a larger lattice unit 336 (forming a lower density portion of the lattice 330), and a largest lattice unit 338 (forming the lowest density portion of the lattice 330). However, as will be appreciated, this simple example is provided for ease of explanation only. The lattice 330 need not be composed of a set number of distinct lattice unit sizes. Rather, the lattice unit sizes can be adjusted in a continuous fashion in one or more portions of the mold design, or continuously across the mold design, as needed. In addition, as described above, one or more portions 340 of the mold design can be entirely removed, leaving behind empty space in the mold design.

The example shown represents generally the results of processing of the lattice 330 to adjust the density of the lattice 330 based on temperature data. As shown, lattice density increases in proximity to hot zones, which typically form near the gate location 315 where the hot liquid material used to form the part is injected. Likewise, lattice density decreases in proximity to colder zones, which typically form farthest from the gate location 315, as well as in locations where the cooling line 320 has an opportunity to reduce the temperature in that region. In the example shown, solid mold material is kept between the interior space 310 of the mold and the cooling line 320, but in some implementations, solid mold material in this region can also be replaced with the lattice 330. Likewise, as shown in this example, the lattice 330 abuts the cooling line 320 directly, but in some implementations, a good portion of solid mold material is left in proximity to the cooling line 320.

In general, more mold material between the interior of the cavity 300 and the cooling line 320 translates into more conduction of heat from hot to cold zones, and thus more rapid removal of heat from the mold. Moreover, since recirculation of heat can occur when hot fluid comes in contact with already cooled regions of the mold, mold material can be removed from regions that will already be cooled off, such as by creating one or more hollow zones 340 and/or reducing the density of the lattice 330.

Figure 3C:
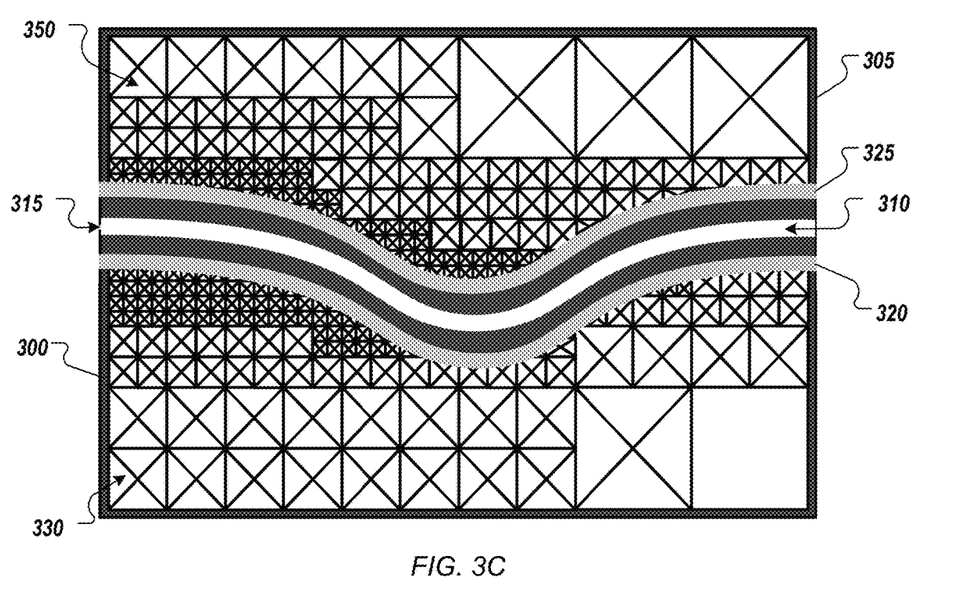

The same process applied to the mold cavity 300 can also be applied to the mold core 305. Thus, as shown in FIG. 3C, a substantial portion of the mold core 305 is replaced with a lattice 350 that couples with the mold core 305 and with the cooling line 325 integrated into the mold core 305. In the illustrated example, the lattice 350 is composed of the same lattice units types as used in the lattice 330. But this is not required; different lattice unit types and/or different lattice topologies can be used in the mold core 305 versus the mold cavity 300, and different lattice unit types and/or different lattice topologies can be used within each of the mold core 305 and the mold cavity 300. In any case, the density of the lattice 350 varies in proximity to the mold core and the cooling lines integrated into the mold core so as to improve heat conduction properties of the conformal cooling mold.

In the example shown in FIG. 3C, the lattice 350 is composed of the same four distinct lattice unit sizes. However, as for lattice 330, the lattice 350 need not be composed of a set number of distinct lattice unit sizes. Rather, the lattice unit sizes can be adjusted in a continuous fashion in one or more portions of the mold design (e.g., in the core 305 and/or the cavity 300), or continuously across the mold design, as needed. In addition, as described above, one or more portions of the mold design can be entirely removed, leaving behind empty space in the mold design (e.g., in the core 305 and/or the cavity 300).

The example shown represents generally the results of processing of the lattice 350 to adjust the density of the lattice 350 based on temperature data. As shown, lattice density increases in proximity to hot zones, which typically form near the gate location 315 where the hot liquid material used to form the part is injected. Likewise, lattice density decreases in proximity to colder zones, which typically form farthest from the gate location 315, as well as in locations where the cooling line 325 has an opportunity to reduce the temperature in that region. In the example shown, solid mold material is kept between the interior space 310 of the mold and the cooling line 325, but in some implementations, solid mold material in this region can also be replaced with the lattice 350. Likewise, as shown in this example, the lattice 350 abuts the cooling line 325 directly, but in some implementations, a good portion of solid mold material is left in proximity to the cooling line 325.

As before, more mold material between the interior of the cavity 300 and the cooling line 325 translates into more conduction of heat from hot to cold zones, and thus more rapid removal of heat from the mold. Moreover, since recirculation of heat can occur when hot fluid comes in contact with already cooled regions of the mold, mold material can be removed from regions that will already be cooled off, such as by creating one or more hollow zones and/or reducing the density of the lattice 350.

Figure 3D:
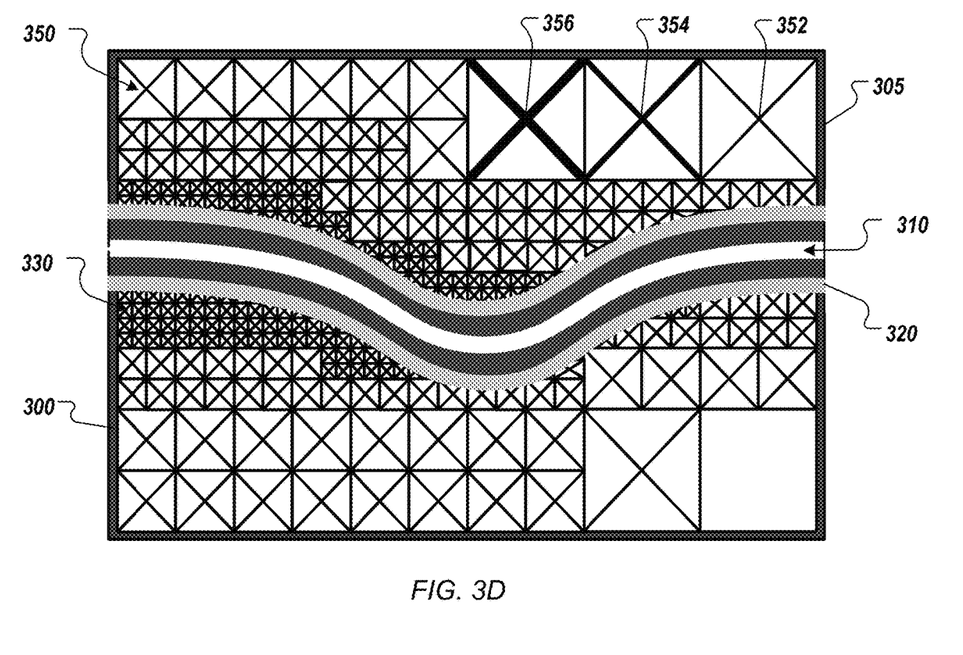

In addition, the density of each of two or more lattice unit cells of the lattice 350 varies to provide additional structural support to the mold core 305 where needed. For ease of illustration, only the largest unit cells in the mold core 305 are addressed here. As shown in FIG. 3D, the beams 352 of a first unit cell are kept at their original size since the computer simulation showed no need for increased strength in this region. However, in light of the computer simulation of the pressures to be created in the mold during actual use, the beams 354 of a second unit cell have been thickened to increase the strength of the mold core 305 in this region, and the beams 356 of a third unit cell have been thickened even more to further increase the strength of the mold core 305 in that region. Note that a similar variation (not shown) in the density of each of two or more lattice unit cells of the lattice 330 is included in the mold design to provide additional structural support to the mold cavity 300 where needed.

Figure 4:
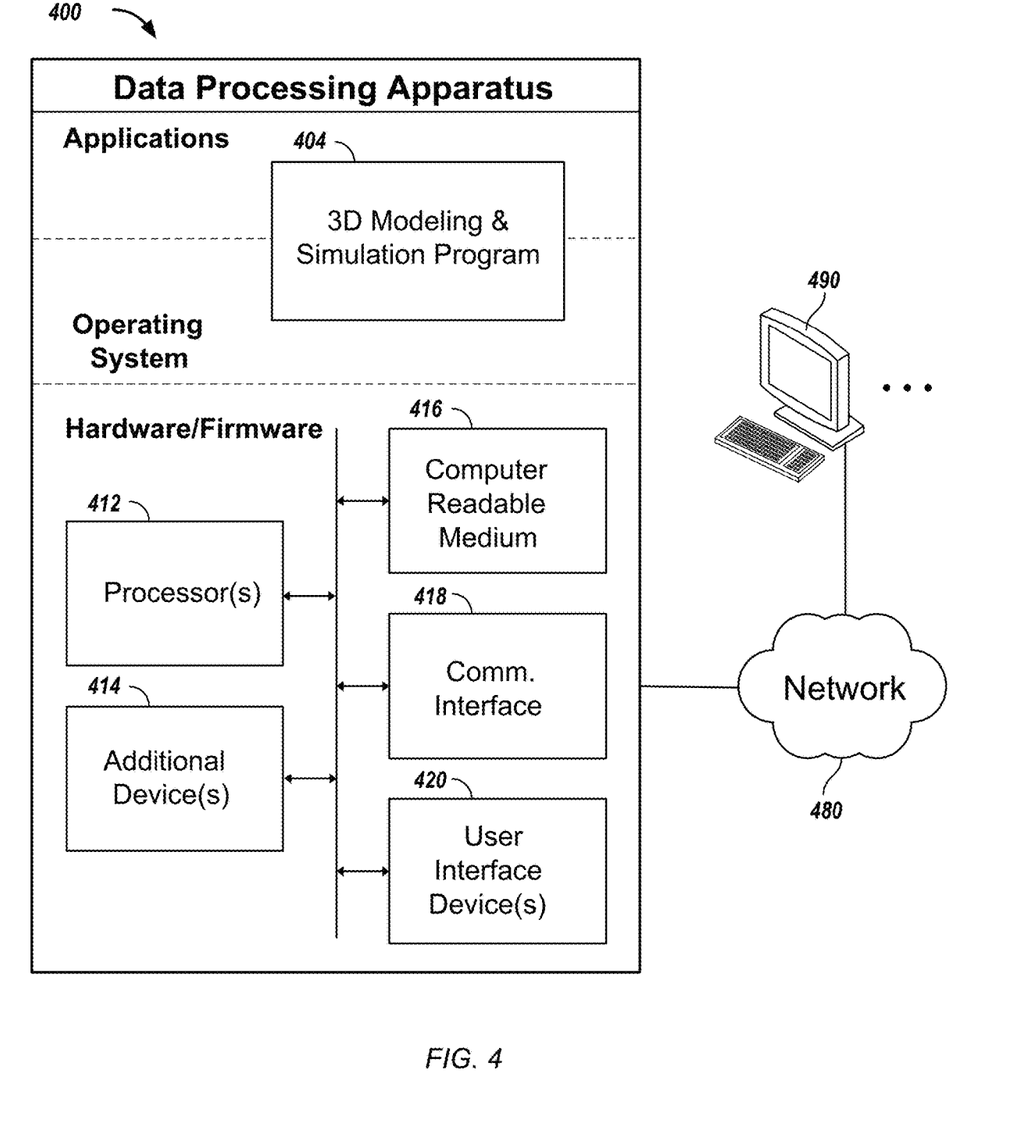
FIG. 4 is a schematic diagram of a data processing system usable to implement the described systems and techniques.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of a 3D modeling and simulation program 404, such as described above. The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses its communication interface 418 to communicate with one or more computers 490, for example, over a network 480. Examples of user interface devices 420 include a display, a camera, a speaker, a microphone, a tactile feedback device, a keyboard, and a mouse. The data processing apparatus 400 can store instructions that implement operations associated with the program(s) described above, for example, on the computer readable medium 416 or one or more additional devices 414, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
obtaining temperature data and pressure data for a three dimensional model of a conformal cooling mold from a computer simulation of an injection molding process using the conformal cooling mold;
replacing at least a portion of a solid volume of the three dimensional model of the conformal cooling mold with a lattice structure to reduce a total mass of the conformal cooling mold;
adjusting a number of lattice unit cells for the lattice structure in accordance with the temperature data from the computer simulation to increase heat conduction through the lattice from hotter areas of the conformal cooling mold;
adjusting one or more thicknesses of beams forming the lattice structure in accordance with the pressure data from the computer simulation to prevent structural failure of the conformal cooling mold; and
providing an updated version of the three dimensional model of the conformal cooling mold that incorporates the lattice structure after adjustment of the number of lattice unit cells and the one or more thicknesses of beams forming the lattice structure;
wherein the replacing comprises:
replacing a first portion of the solid volume with the lattice structure in accordance with the temperature data and the pressure data from the computer simulation; and
removing a second portion of the solid volume entirely in accordance with the temperature data and the pressure data from the computer simulation, leaving an empty space within the three dimensional model of the conformal cooling mold, the empty space of the second portion having no material therein and being in addition to the lattice structure of the first portion.

2. The method of claim 1, wherein the three dimensional model of the conformal cooling mold comprises a three dimensional model of both a cavity of the conformal cooling mold and a core of the conformal cooling mold, and the replacing comprises replacing both a first solid volume portion of the three dimensional model of the cavity of the conformal cooling mold and a second solid volume portion of the three dimensional model of the core of the conformal cooling mold with the lattice structure.

3. A method comprising:
obtaining temperature data and pressure data for a three dimensional model of a conformal cooling mold from a computer simulation of an injection molding process using the conformal cooling mold;
replacing at least a portion of a solid volume of the three dimensional model of the conformal cooling mold with a lattice structure to reduce a total mass of the conformal cooling mold;
adjusting a number of lattice unit cells for the lattice structure in accordance with the temperature data from the computer simulation to increase heat conduction through the lattice from hotter areas of the conformal cooling mold;
adjusting one or more thicknesses of beams forming the lattice structure in accordance with the pressure data from the computer simulation to prevent structural failure of the conformal cooling mold; and
providing an updated version of the three dimensional model of the conformal cooling mold that incorporates the lattice structure after adjustment of the number of lattice unit cells and the one or more thicknesses of beams forming the lattice structure;
wherein the three dimensional model of the conformal cooling mold defines cooling lines integrated into the conformal cooling mold, and adjusting the number of lattice unit cells for the lattice structure comprises:
increasing the number of lattice unit cells for the lattice structure by reducing lattice unit cell size in one or more first regions of the three dimensional model in proximity to the hotter areas of the conformal cooling mold identified by the temperature data from the computer simulation; and
reducing the number of lattice unit cells for the lattice structure by increasing lattice unit cell size in one or more second regions of the three dimensional model to prevent recirculation of heat by the cooling lines integrated into the conformal cooling mold.

4. The method of claim 3, wherein obtaining the temperature data and the pressure data comprises operating a computational injection molding simulation program to identify the hotter areas of the conformal cooling mold.

5. The method of claim 4, wherein adjusting the one or more thicknesses of beams forming the lattice structure comprises operating a computational structural simulation program to avoid stress and buckling failure.

6. The method of claim 5, wherein the computational injection molding simulation program and the computational structural simulation program are each included within a computer aided design (CAD) program, and the method comprises building the conformal cooling mold using an additive manufacturing machine.

7. A system comprising:
a data processing apparatus including at least one hardware processor; and
a non-transitory computer-readable medium encoding instructions configured to cause the data processing apparatus to
replace at least a portion of a solid volume of a three dimensional model of a conformal cooling mold with a lattice structure to reduce a total mass of the conformal cooling mold,
adjust a number of lattice unit cells for the lattice structure, in accordance with temperature data from a computer simulation of an injection molding process using the conformal cooling mold, to increase heat conduction through the lattice from hotter areas of the conformal cooling mold,
adjust one or more thicknesses of beams forming the lattice structure in accordance with pressure data from the computer simulation to prevent structural failure of the conformal cooling mold, and
save an updated version of the three dimensional model of the conformal cooling mold that incorporates the lattice structure after adjustment of the number of lattice unit cells and the one or more thicknesses of beams forming the lattice structure;
wherein the non-transitory computer-readable medium encodes the instructions configured to cause the data processing apparatus to replace the at least a portion of the solid volume of the three dimensional model by replacing a first portion of the solid volume with the lattice structure in accordance with the temperature data and the pressure data from the computer simulation, and removing a second portion of the solid volume entirely in accordance with the temperature data and the pressure data from the computer simulation, leaving an empty space within the three dimensional model of the conformal cooling mold, the empty space of the second portion having no material therein and being in addition to the lattice structure of the first portion.

8. The system of claim 7, wherein the three dimensional model of the conformal cooling mold comprises a three dimensional model of both a cavity of the conformal cooling mold and a core of the conformal cooling mold, and the non-transitory computer-readable medium encodes the instructions configured to cause the data processing apparatus to replace the at least a portion of the solid volume of the three dimensional model by replacing both a first solid volume portion of the three dimensional model of the cavity of the conformal cooling mold and a second solid volume portion of the three dimensional model of the core of the conformal cooling mold with the lattice structure.

9. A system comprising:
a data processing apparatus including at least one hardware processor; and
a non-transitory computer-readable medium encoding instructions configured to cause the data processing apparatus to
replace at least a portion of a solid volume of a three dimensional model of a conformal cooling mold with a lattice structure to reduce a total mass of the conformal cooling mold,
adjust a number of lattice unit cells for the lattice structure, in accordance with temperature data from a computer simulation of an injection molding process using the conformal cooling mold, to increase heat conduction through the lattice from hotter areas of the conformal cooling mold, adjust one or more thicknesses of beams forming the lattice structure in accordance with pressure data from the computer simulation to prevent structural failure of the conformal cooling mold, and save an updated version of the three dimensional model of the conformal cooling mold that incorporates the lattice structure after adjustment of the number of lattice unit cells and the one or more thicknesses of beams forming the lattice structure;

wherein the three dimensional model of the conformal cooling mold defines cooling lines integrated into the conformal cooling mold, and the non-transitory computer-readable medium encodes the instructions configured to cause the data processing apparatus to adjust the number of lattice unit cells for the lattice structure by increasing the number of lattice unit cells for the lattice structure by reducing lattice unit cell size in one or more first regions of the three dimensional model in proximity to the hotter areas of the conformal cooling mold identified by the temperature data from the computer simulation, and reducing the number of lattice unit cells for the lattice structure by increasing lattice unit cell size in one or more second regions of the three dimensional model to prevent recirculation of heat by the cooling lines integrated into the conformal cooling mold.

10. The system of claim 9, wherein the instructions encoded in the non-transitory computer-readable medium comprise instructions of a computational injection molding simulation program used to identify the hotter areas of the conformal cooling mold.

11. The system of claim 10, wherein the instructions encoded in the non-transitory computer-readable medium comprise instructions of a computational structural simulation program used to adjust the one or more thicknesses of beams forming the lattice structure to avoid stress and buckling failure.

12. The system of claim 11, comprising an additive manufacturing machine used to build the conformal cooling mold.

* * * * *

UNITED STATES PATENT AND TRADEMARK OFFICE
CERTIFICATE OF CORRECTION

PATENT NO. : 10,946,555 B2  
APPLICATION NO. : 15/786254  
DATED : March 16, 2021  
INVENTOR(S) : Abhishek Trivedi and Andriy Banadyha Page 1 of 1

It is certified that error appears in the above-identified patent and that said Letters Patent is hereby corrected as shown below:

On the Title Page

Column 1, (72) Inventors, Lines 2-3:
Delete "Andriy Banadyga, Uxbridge (GB)" and insert --Andriy Banadyha, Uxbridge (GB)-- therefor.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*